United States Patent [19]

Haga et al.

[11] Patent Number: 5,985,420

[45] Date of Patent: Nov. 16, 1999

[54] PLASTIC LENSES AND METHOD OF PRODUCING THE SAME

[75] Inventors: Mitsunobu Haga, Matsudo; Yoshio Onisawa, Ibo-gun; Kohei Shimizu, Kobe, all of Japan

[73] Assignee: Daicel Abosisangyo Co., Ltd., Hyogo, Japan

[21] Appl. No.: 08/763,090

[22] Filed: Dec. 10, 1996

[30] Foreign Application Priority Data

Dec. 22, 1995 [JP] Japan ................................. 7-350504

[51] Int. Cl.[6] .............................. B32B 7/02; B32B 27/08; B32B 27/16; B32B 27/30
[52] U.S. Cl. .......................... 428/212; 428/412; 428/522; 522/178; 522/182; 522/184; 522/185; 522/186; 522/188; 427/487; 427/508; 427/510; 427/162; 427/164; 427/407.1
[58] Field of Search ..................... 428/412, 522, 428/217, 212; 522/184, 185, 186, 188, 178, 182; 427/487, 508, 510, 162, 164, 407

[56] References Cited

U.S. PATENT DOCUMENTS

| 4,018,939 | 4/1977 | Merrill et al. | 427/54 |
|---|---|---|---|
| 5,047,270 | 9/1991 | Mori et al. | 428/35.2 |
| 5,213,880 | 5/1993 | Yaguchi | 428/217 |
| 5,239,029 | 8/1993 | Yaguchi | 526/276 |
| 5,280,090 | 1/1994 | Kurahashi et al. | 524/479 |
| 5,480,917 | 1/1996 | Kruger et al. | 522/33 |
| 5,565,501 | 10/1996 | Hosokawa et al. | 522/83 |
| 5,578,378 | 11/1996 | Kruger et al. | 428/441 |

FOREIGN PATENT DOCUMENTS

| 58-074169 | 5/1983 | Japan . |
|---|---|---|
| 61-165724 | 7/1986 | Japan . |
| 02294339 | 12/1990 | Japan . |

Primary Examiner—Vivian Chen

[57] ABSTRACT

A plastic lens comprising the first acrylic hard coated layer formed on the outside surface of a plastic lens base and, in the inside surface, an antifogging coated layer with interposing of the second acrylic hard coated layer is obtained by coating the both sides of a plastic lens base with an acrylic hard coating agent, masking the outside surface with a peelable masking agent (e.g. a coating composition containing poly(vinyl chloride) or vinyl chloride-vinyl acetate copolymer), coating at least the inside surface with an antifogging agent, and removing the masking layer. As the hard coating agent or antifogging agent, use can be made of an ultraviolet-curable resin composition, and as the masking agent, a coating composition containing a poly(vinyl chloride) or vinyl chloride-vinyl acetate copolymer may be employed.

3 Claims, No Drawings

PLASTIC LENSES AND METHOD OF PRODUCING THE SAME

FIELD OF THE INVENTION

This invention relates to a plastic lens having scratch resistance (abrasion resistance) on one side and other function inclusive of antifogging property on the other side, and a method of producing the plastic lens.

BACKGROUND OF THE INVENTION

When one practices land sports such as skiing, skating, mountain climbing or hiking, or marine sports, or drives a bicycle or a motorcycle with wearing spectacles or goggles, the spectacles or goggles may sometimes be fogged or steamed over. In particular, when one moves between the conditions where the temperatures and humidities are remarkably different each other, the spectacles or goggles tend to become steamed over. By way of illustration, when the outside air temperature is low, the outside surfaces of the spectacles or goggles are exposed to the low temperature, and, the temperature of the inside raises due to a body heat and the humidity increases due to sweating to become dew point or higher, and hence the spectacles or goggles are fogged or steamed up. Further, the spectacles or goggles are steamed over due to a breath (sigh). Among other situations, when one wears goggles, the fogging or steaming up can hardly be removed since the goggles form almost sealed spaces.

Japanese Patent Application Laid-open No. 165724/1986 (JP-A-61-165724) relates to cleaning and antifogging treatment of surfaces of spectacles, and discloses a process which comprises flowing a treating agent impregnated and held on a holding part to a coating part with the use of capillarity phenomenon, cleaning the surfaces of spectacles on the coating part and treating the surfaces with a treating agent. According to this technology, however, a surfactant such as polyoxyethylene nonyl phenol and the like is used as the antifogging agent so that impartment of an eternal antifogging property for the spectacles would not be expected.

Japanese Patent Application Laid-open No. 74169/1983 (JP-A-58-74169) discloses a process which comprises, in a method of coating multi-focus lenses such as double-focus or triple-focus lenses with a hard coating agent or antifogging-coating agent, coating a plastic lens base having a boundary by means of dipping with holding the boundary of the lens at a right angle with respect to the liquid level or at an angle not greater than 20° with respect to the perpendicular (right angle). This process is proposed for the purpose of inhibiting accumulation of the coating composition in the boundary part of the lens.

Japanese Patent Application Laid-open No. 294339/1990 (JP-A-2-294339) proposes an antifogging process which comprises immersing a plastic molded article such as a lens or an end plate (mirror board) with a polymerizable coating composition containing a water-soluble monomer, a monomer copolymerizable with this water-soluble monomer, and a polymerization initiator and harding the resultant immersed article for antifogging treatment.

However, even subjected to these antifogging treatments, the scratch resistance of articles can hardly be improved. That is, since the antifogging property due to the antifogging agent and the scratch resistance are in such an antinomy or contradictive relation that the scratch resistance is deteriorated with an increasing antifogging property, and the antifogging property is adversely affected with an enhancing scratch resistance, excellent antifogging property and high abrasion resistance are incompatible with each other. Therefore, when the antifogging property is improved, the spectacles or goggles tend to be scratched or abraded in case that the spectacles or goggles collide with dust or are in contact with or rubbed with other article when handled.

On the other hand, for the purpose of achieving high antifogging property and enhanced scratch resistance, there has been intended a process which comprises treating the inside surface of a lens with an antifogging agent and treating the outside surface of the lens with a hard coating agent. According to the dipping technology, however, the both sides of the lens are coated so that it is difficult to impart the antifogging property to the inside surface of the lens and the scratch resistance to the outside thereof, respectively. Further, there has been thought of coating one side and thereafter the other side of a lens base respectively with the use of spray coating or flow coating technology. According to this process, however, an equipment at high cost is required and the produc-tivity or yield tends to be deteriorated.

Incidentally, a lens having different functions on each side respectively may also be obtained by, for example, a process which comprises masking the inside surface of a plastic lens base with a masking agent, hard coating the outside surface by immersing, removing the masking by means of peeling, masking the hard coated surface and coating the inside surface with an antifogging agent by immersing, and removing the masking by stripping. This technology, however, requires a great number of steps and is complicated, and the productivity of lenses can hardly be improved. Further, when an organic solvent-based masking agent is directly coated to a plastic, removal of the masking agent is difficult because of great adhesion strength of the masking agent with respect to the plastic lens base. On the other hand, when a water-base latex paint is used as the masking agent, although the resultant masking coated layer can be peeled off or stripped from the plastic base, but it peels off or partially peels off, or is solved out in a succeeding step such as immersing step with the use of an organic solvent-based hard coating agent or antifogging agent, or washing or cleaning step. Accordingly, a masking agent having such an adequate adhesive strength as to have a high adhesive property with respect to a plastic base in the immersing step, and to be capable of peeling off after the immersing step would hardly be found out.

Furthermore, it is possible to use a masking film in lieu of a masking agent, but the film cannot be along concave and convex shape of the lens and, even when it is applied to a plane, the workability is deteriorated. Further, the surface which has not been treated with a hard coating agent has a tendency to be injured or scratched in laminating step, and the external appearance is sacrificed since an adhesion mark is remained after peeling off the film.

SUMMARY OF THE INVENTION

It is, therefore, an object of the present invention to provide a plastic lens which is imparted with high scratch resistance (abrasion resistance) on one side (outside surface) and with other function than the scratch resistance on the other side (inside surface) (i.e. a plastic lens imparted with different functions respectively to each side), and a method of producing the plastic lens.

Another object of the invention is to provide a plastic lens with a high scratch resistance and antifogging property and a method of producing the same.

It is a further object of the invention to provide a method of manufacturing a plastic lens having different functions in few steps with high efficiency.

The inventors of the present invention did much investigation to accomplish the above objects, and, as a result, found that although the adhesive property (adhesive power) of an over-coated film or layer with respect to an acrylic hard coated layer has been considered to be small, the adhesive property or adhesive power of the over-coated layer with respect to the hard coated layer can remarkably be enhanced with retaining high adhesive property with respect to a plastic lens base when extent or degree of curing of the acrylic hard coating agent is decreased. The present invention has been accomplished based on the above findings.

Thus, the plastic lens of the present invention comprises;

a plastic lens base, the first acrylic hard coated layer formed on one side of the plastic lens base, and a functional layer except for the first hard coated layer formed, through the second acrylic hard coating layer, on the other side of the lens base. The functional layer (membrane) in this plastic lens includes an antifogging coated layer and others.

According to the method of the invention, a plastic lens is manufactured by a process which comprises the steps of;

a hard coating step for coating the both sides of a plastic lens base with an acrylic hard coating agent containing a polymerizable compound having an acryloyl group or a methacryloyl group, a masking step for masking, after the hard coating, the outside hard coated layer of the lens base with a peelable masking agent, an antifogging step for coating, after the masking, at least the inside hard coated layer of the lens base with an antifogging agent, and a removing step for removing the masking layer after the antifogging coating.

The acrylic hard coating agent in this process may for example be an ultraviolet ray-curable hard coating agent. When the ultraviolet ray-curable hard coating agent is used, the hard coating step may be conducted by coating the both sides of the plastic lens base with the ultraviolet ray-curable hard coating agent, irradiating the coated layers in such a manner that the irradiating quantity to the inside covering layer is equal or less than that of the outside covering layer to form cured layers, and the masking step may be carried out by masking the outside cured layer of the lens base with the masking agent. The masking agent may comprise a coating composition containing a vinyl chloride-series polymer comprising at least a vinyl chloride unit, and the antifogging agent may be composed of an ultraviolet ray-curable acrylic antifogging agent or others.

The method of the invention also includes a method of producing a plastic lens, which method comprises the steps of;

a hard coating step for coating the both sides of a plastic lens base with an ultraviolet ray-curable acrylic hard coating agent and curing the hard coated layers by irradiating the coated layers in a proportion of the ultraviolet ray irradiation quantity Io with respect to the outside covering layer of the lens base relative to the ultraviolet ray irradiation quantity Ii with respect to the inside covering layer of the lens base is such that Io/Ii equals 1/1 to 20/1 (times), a masking step for masking the outside cured layer of the lens base with a masking agent, an antifogging step for coating, after the masking treatment, at least the inside cured layer of the lens base with an ultraviolet ray-curable acrylic antifogging agent and irradiating the treated surface with an ultraviolet ray to cure the antifogging agent, and a removing step for removing the masking layer from the cured layer.

The term "lens" as used in this specification broadly means and includes sunglasses, goggles and others in addition to lenses for spectacles, and the lens may be any of a spherical lens such as a convex lens and a concave lens, an aspherical lens and sheet-like lens (a plate). The term "the outside" means the concave surface in a spherical lens, and a surface to be the outside surface in final in a plane lens. Further, the acrylic monomer and methacrylic monomer are generically referred to as "the (meth)acrylic monomer".

DETAILED DESCRIPTION OF THE INVENTION

[Plastic lens]

On one side (the outside surface) of the plastic lens base is formed an acrylic hard coated layer, and on the other side (the inside surface) is formed a functional layer (membrane) with interposition of the hard coated layer. This functional layer may only be a functional layer except for the hard coated layer, and it may be, for example, an ultraviolet-absorbable layer, an infrared-absorbable layer, an anti-reflection layer, a reflecting layer, a photochromic layer and others, but an antifogging coated layer can preferably be employed for the purpose of inhibiting fogging (steaming up) of the lens due to the differences of the temperatures and/or humidities or other conditions. In the following description, the present invention is mainly described with the antifogging coated layer taken as an example of typical functional layer.

Plastic lens base

The plastic lens base may be made of a polymer having a high light transmittance and being moldable, such as a poly(methyl methacrylate) and other (meth)acrylic resins; polycarbonates; a polyethylene glycol bisallylcarbonate and other polydiallyl glycol carbonates; polystyrene and so forth. Among these plastics, polycarbonates and polydiallyl glycol carbonates may advantageously be used for their excellent clarity, moldability and high mechanical strength. The plastic lens base may be manufactured by a conventional technology inclusive of injection molding, cast method and so forth. The lens base may contain a variety of additives such as dyes, pigments, antioxidants and other stabilizers, plasticizers, polymerization regulators, release agents and the like.

Hard coated layer

The acrylic hard coated layer may be made of a crosslinked hard acrylic resin coated layer (covering layer) in order to impart the scratch resistance to the lens. The preferable crosslinked hard coated layer may be made of a polymerizable hard coating agent containing a polymerizable compound having an acryloyl group or a methacryloyl group.

As the polymerizable compound in the hard coating agent, there may be mentioned for example a urethane (meth)acrylate oligomer, an epoxy (meth)acrylate oligomer, an oligoester (meth)acrylate and other oligomers each having 2 or more (meth)acryloyl groups; ethylene glycol di(meth)acrylate, propylene glycol di(meth)acrylate, 1,4-butanediol di(meth)acrylate, 1,6-hexanediol (meth)acrylate, neopentyl glycol di(meth)acrylate and other alkylene glycol di(meth)acrylates, diethylene glycol di(meth)acrylate, triethylene glycol di(meth)acrylate, dipropylene glycol di(meth)acrylate and other (poly)oxyalkylene glycol di(meth)acrylates, glycerin di(meth)acrylate, an adduct of di(meth)acrylate wherein an alkylene oxide (e.g. ethylene oxide, propylene oxide) is added to bisphenol A [e.g. 2,2-bis[4-(2-(meth)-acryloyloxyethoxy)phenyl]propane, 2,2-bis[ 4-(2-(meth)-acryloyloxypropoxy)phenyl]propane] and other 2-functional (meth)acrylates; trimethylolpropane tri (meth)-acrylate, pentaerythritol tri(meth)acrylate, pentaerythritol tetra(meth)acrylate, dipentaerythritol hexa(meth) acrylate, (meth)acrylates each having a phosphazo group —P=N— and a (meth)acryloyl group, and other multifunctional (meth)acrylates.

The (meth)acrylate having a phosphazo group includes chain or cyclic compounds each having a phosphazo group —P=N—. The bonding mode of the phosphazo group and (meth)acryloyl group may be shown by, for instance, the formula

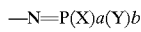

wherein at least one of X and Y represents a polymerizable group having a (meth)acryloyl group, and a+b=2. The (meth)acrylate having a phosphazo group may practically be a cyclic compound, and includes, for example, (meth) acrylates each having a phosphazene ring obtainable by allowing a phosphazene ring (e.g. a trimer or tetramer) containing compound (PNCl$_2$, wherein n denotes an integer of about 3 to 5) as produced by a reaction of phosphorus pentachloride and ammonium chloride, and a hydroxyl group-containing (meth)acrylate such as hydroxyethyl (meth)acrylate or hydroxypropyl (meth)acrylate.

The preferred phosphazo group-containing (meth) acrylate may be shown by the following formula (I).

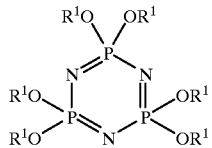

wherein $R^1$ represents, the same or different, a hydrogen atom, a $C_{1-6}$ alkyl group or a polymerizable group having a (meth)acryloyl group, and at least one of $R^1$ is a polymerizable group having a (meth)acryloyl group.

The number of the polymerizable group(s) shown by $R^1$ in the compound of the formula (I) is, for instance, about 3 to 6, and preferably about 4 to 6. The preferably polymerizable group $R^1$ may for example be represented by the following formula (II)

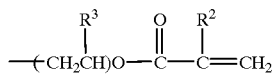

wherein $R^2$ and $R^3$ respectively represent a hydrogen atom or a methyl group.

Further, for the purpose of regulating the characteristics of the cured layer (hard coated layer), a mono-functional (meth)acrylate may be incorporated into the agent. Such mono-functional (meth)acrylate includes, for instance, methyl (meth)acrylate, ethyl (meth)acrylate, butyl (meth) acrylate, hexyl (meth)acrylate, 2-ethylhexyl (meth)acrylate and other $C_{1-18}$ alkyl (meth)acrylates, cyclohexyl (meth) acrylate, phenyl (meth)acrylate, benzyl (meth)acrylate, isobornyl (meth) acrylate, 2-hydroxyethyl (meth)acrylate, 2-hydroxypropyl (meth)acrylate and other hydroxyl group-containing (meth) acrylates, glycidyl (meth)acrylate, N,N-diethylaminoethyl (meth)acrylate and other basic nitrogen atom-containing (meth)acrylates, trifluoroethyl (meth) acrylate, tetrafluoropropyl (meth)acrylate and other halogen-containing (meth)acrylates and so on.

The polymerizable hard coating agent may also be composed of a thermosetting resin composition containing a thermal polymerization initiator (e.g. benzoyl peroxide, cumene hydroperoxide, dicumyl peroxide and other organic peroxides). The polymerizable hard coating agent may preferably be composed of a photo-curable resin composition containing a photopolymerization initiator, in particular, an ultraviolet ray-curable resin composition (an ultraviolet ray-curable hard coating agent).

As the photopolymerization initiator, there may be mentioned, for instance, benzoin or its derivatives (e.g. benzoin, benzoin isopropyl ether, benzoin isobutyl ether, etc.), ketones [e.g. 1-hydroxycyclohexyl phenyl ketone, acetophenone or its derivatives (e.g. alkoxyacetophenone), propiophenone or its derivatives (e.g. 2-hydroxy-2-methylpropiophenone), benzophenone or its derivatives (e.g. 4,4'-dimethoxybenzophenone, 4,4'-bis(4-diethylaminophenyl)ketone, etc.], benzyl or its derivatives (e.g. benzyl and benzyl methyl ketal), thioxanthone or its derivatives (e.g. 2,4-diethyl-thioxanthone, 2-ethylthioxanthone, 2-isopropylthio-xanthone, 2-chlorothioxanthone, etc.) and other conventional photopolymerization initiators. These photopolymerization initiators may be used singly or in combination.

The amounts of the thermal polymerization (thermopolymerization) initiator and photopolymerization initiator may respectively be selected from a range of about 0.1 to 10 parts by weight relative to 100 parts by weight of the polymerizable compound.

The photo-polymerization initiator may be used in combination with a photo-polymerization accelerator (e.g. triethylamine, triethanolamine, dimethylamino-ethanol, p-dimethylaminoacetophenone, 4-dimethylamino-benzoic acid, ethyl 4-dimethylaminobenzoate, ethyl 4-diethylaminobenzoate, isoamyl 4-dimethylaminobenzoate and other tertiary amines, triphenylphosphine and other phosphines).

Where necessary, the hard coating agent may be an organic solvent-containing coating composition containing an organic solvent such as hydrocarbons, alcohols, esters, ketones, ethers and the like.

The thickness of the hard coated layer may be selected from a range not interfering with the abrasion resistance or others, and is, for example, about 1 to 50 μm, preferably about 2 to 30 μm and more preferably about 3 to 15 μm (e.g. about 3 to 10 μm).

Meanwhile, a hard coated layer may conventionally be formed from a thermosetting siloxane-series composition. According to this technology, however, when an over-coating agent is applied on the coated layer of the siloxane-series composition, the over-coating agent is repelled or crawled and a homogenous coated layer would not be expected. Further, even if a smooth coating is formed, the coated layer (covering layer) after dried and cured is insufficient in adhesive power with respect to the base material. Furthermore, the adhesive power and weather resistance (weather proof) of the coated layer tend to be deteriorated with a lapse of time even when the adhesive property of the over-coating layer with respect to the coated layer (covering layer) is enhanced by means of surface treatment of the over-coating layer.

Antifogging coated layer

The antifogging (anti-dim) coated layer may be made of a various hydrophilic polymer (e.g. poly(vinyl alcohol), an ethylene-vinyl alcohol copolymer, polyvinylpyrrolidone, polyethylene glycol, a cellulose ester and a cellulose ether, a carboxyl group-containing acrylic resin, a hydroxyl group-containing acrylic resin, etc.). For the purpose of retaining an everlasting antifogging property, however, use can advantageously be made of a cross-linkable composition comprising a hydrophilic group-containing compound (e.g. a thermosetting resin composition comprising a polyol such as a polyester polyol, a polyether polyol and an acrylic polyol, and a crosslinking agent such as a melamine resin; a thermosetting resin composition comprising the above-mentioned polyol and a polyisocyanate; a thermosetting resin comprising a polyether-series epoxy resin and a setting agent (hardening agent)), a photo-curable resin composition comprising a (meth)acrylic hydrophilic polymerizable compound (in particular, an antifogging agent composed of an ultraviolet ray-curable resin composition). In especial, a (meth)acrylic resin composition (e.g. a thermosetting resin composition and a photo-curable resin composition) may advantageously be employed for enhancement of the adhesive property with respect to the hard coated layer, and the antifogging coated layer may preferably be formed using a photo-curable resin composition for improvement of the productivity or the like.

The (meth)acrylic hydrophilic polymerizable com- pound includes (meth)acrylates each having a hydrophilic group such as a hydroxyl group, a carboxyl group, an ether group and so on. As examples of such (meth)acrylate, there may be mentioned 2-hydroxyethyl (meth)acrylate, 2-hydroxypropyl (meth)acrylate, diethylene glycol mono(meth)acrylate, dipropylene glycol mono(meth)acrylate, a mono(meth) acrylate of a polyethylene glycol with a polymerization degree n of about 3 to 50, polypropylene glycol mono(meth) acrylate and other hydroxyl group-containing (meth) acrylates, a (meth)acrylate of an adduct formed by allowing an alkylene oxide (e.g. ethylene oxide) to add to an alkylphenol such as nonylphenol, (meth)acrylic acid, glycerin mono(meth)acrylate, N-vinylpyrrolidone and other hydrophilic monofunctional (meth)acrylates; diethylene glycol di(meth)acrylate, dipropylene glycol di(meth)acrylate, polyethylene glycol di(meth)acrylate with a polymerization degree n of about 3 to 50, polypropylene glycol di(meth) acrylate, glycerin di(meth)acrylate, trimethylolpropane di(meth)acrylate, pentaerythritol di(meth)acrylate, pentaerythritol tri(meth)acrylate, a di- or tri-(meth)acrylate of an adduct formed by allowing an alkylene oxide (e.g. ethylene oxide) to add to glycerin, a urethane (meth)acrylate oligomer having a polyether unit, an oligoester (meth) acrylate having a polyether unit and other (meth)acrylates each having 2 or more polymerizable functional groups. These hydrophilic polymerizable compounds may be used singly or in combination, and they may be employed in combination with the polymerizable compound exemplified in the explanation of the hard coating agent. The photopolymerizable resin composition for the formation of the antifogging coated layer may practically comprise a (meth) acrylate having 2 or more polymerizable functional groups for the formation of a strong coat.

The antifogging photo-curable resin composition may be formed from, in addition to the polymerizable compound, a hydrophilic polymer (e.g. a homo- or copolymer of the (meth)acrylate having a hydroxyl group, a carboxyl group, an ether group or other hydrophilic group, a copolymer of the (meth)acrylate having a hydrophilic group and other copolymerizable monomer). The copolymerizable monomer includes, for instance, an alkyl (meth)acrylate, diethylamino (meth)acrylate and other alkylamino (meth)acrylates, styrenic monomers and others.

The antifogging photo-curable resin composition may usually comprise a photopolymerization initiator, as mentioned above. Where necessary, the antifogging agent may be an organic solvent-containing coating composition containing an organic solvent such as hydrocarbons, alcohols, esters, ketones, ethers and the like.

The thickness of the antifogging coating formed on the inside surface of the lens base though the hard coating layer may be selected from a range imparting the antifogging (anti-steam or anti-dim) property, and is, for example, about 1 to 30 $\mu$m, preferably about 2 to 20 $\mu$m and practically about 3 to 15 $\mu$m. When the functional layer is an ultraviolet ray-absorbable layer or an infrared-absorbable layer, such functional layer can be formed with the use of a resin composition containing an ultraviolet ray-absorbent or an infrared-absorbent (in particular, a composition as produced by adding an ultraviolet ray-absorbent or an infrared-absorbent to a hard coating agent as mentioned above or a (meth)acrylic thermosetting or photo-curable resin composition). When the functional layer is an anti-reflection layer, the layer may be formed from a resin composition containing a fine powder (a fine powder of submicron level) of an inorganic compound such as silicon dioxide, silicon oxide, aluminum oxide, magnesium fluoride and gold. In case that the functional layer is a photochromic layer, it may be formed by using a conventional photochromic material or a resin composition containing a photochromic material (in especial, a composition as prepared by adding a photochromic material to the hard coating agent as mentioned above or (meth)acrylic thermosetting or photo-curable resin composition).

[Production process of plastic lens]

The plastic lens of the present invention can be obtained through the steps of a hard coating step of coating the plastic lens base with the acrylic hard coating agent, a masking step of masking, after the hard coating treatment, the lens with a masking agent, a coating step of coating the lens with a functional material inclusive of the antifogging agent, after the mask- ing treatment, and a removing step of removing or eliminating the masking layer after the coating treatment. In the following description, the process where the functional material is the anti-dim agent is mainly described.

[Hard coating step]

In the hard coating step, the both sides of the plastic lens base are coated with the acrylic hard coating agent. The coating may be effected by a conventional technology such as dipping (immersing), spray coating, flow coating, spin coating or the like. Incidentally, according to the flow coating or spin coating technology, an equipment in a high cost is required, productivity tends to be sacrificed and hence is disadvantageous in commercial use, and according to the spray coating technology, the homogeneity of the coating layers of the both sides may occasionally be deteriorated. Therefore, the immersing method which insures efficient coating of the both sides of the plastic lens base can preferably be employed in many cases.

There are some species of the acrylic hard coating agent which are not adversely affected in the adhesive power with respect to the over coating agent (antifogging agent) irrespective of extent or degree of hardening or curing. However, in general, the adhesive power of the hard coating agent tends to be decreased with an increasing degree of curing of the hard coating layer, although the abrasion resistance is enhanced. In other words, the adhesive power with respect to the over coating agent (antifogging agent) has a tendency to be increased with a decreasing degree of hardening of the hard coated layer. Therefore, when the coating of the both sides of the plastic lens base is conducted with the use of a photo-curable hard coating agent (e.g. an ultraviolet ray-curable hard coating composition), it is preferable to irradiate the inside covering layer with an radiation (ultraviolet ray) in an irradiation quantity of equal or less than that of the outside surface to be coated with the masking agent, and to form a hard coated layer on the outside surface with a sufficient harness (rigidity), and a hard coated layer on the inside surface having a sufficient adhesive power with respect to the antifogging coat. That is, it is advantageous that a sufficient quantity of the ultraviolet ray is irradiated to the outside coated layer to proceed curing reaction, and the curing of the inside coated layer is effected with an irradiation of the ultraviolet ray in a decreased quantity.

The irradiation amounts (irradiation quantities) of the outside covering layer and the inside covering layer may be selected according to the species of the acrylic hard coating agent, and with a proviso that the irradiation quantity as required to impart 98 to 100% of the saturated hardness is settled as 100, the irradiation quantity to the inside covering layer is about 50 to 100 and preferably about 70 to 100. The irradiation quantity as required to impart 98 to 100% of the saturated hardness can be determined by making the relation between the hardness and the irradiation quantity into a graph with the hardness on the vertical axis and the irradiation quantity horizontally, and evaluate as the saturated level of the hardness being a standard.

In the saturated hardness level, the proportion of a remained monomer in the cured coating layer is about 0 to 1% by weight and preferably about 0 to 0.5% by weight based on the total weight of the polymerizable compound. Accordingly, the irradiation quantity to the inside covering layer may also be determined by taking the proportion of the remained monomer in lieu of the saturated hardness (i.e. taking, as the standard, the irradiation quantity as required to make the proportion of remained monomer to be 0 to 1% by weight, and preferably 0 to 0.5% by weight). The amount of the remained monomer may be determined by, for instance, a process which comprises, with the use of extraction treatment, measuring the weights before and after the extraction, a process which comprises measuring the amount based on the relation (calibration curve) between the height of absorption peak (absorption strength) of the infrared absorption spectrum and the amount of the remained monomer, or other technologies. The preferred process includes a process using an infrared absorption spectrum, and, by way of an example, the amount of the remained monomer and hardening degree can be evaluated based on the ratio of the absorption strength in an absorbing region of double bond 1620 to 1640 cm$^{-1}$ and the absorption strength in the absorption region of a carbonyl group.

The proportion of the irradiation (ultraviolet ray) quantity Io for the outside covering layer relative to the irradiation (ultraviolet ray) quantity Ii for the inside covering layer of the lens base (base lens) may be selected according to the species and components of the hard coating agent, and for example is such that Io/Ii equals about 1/1 to 20/1 (times), preferably about 1/1 to 10/1 (times) and more preferably about 1/1 to 5/1 (times). When an ultraviolet ray with a main wavelength of about 300 to 380 nm is used, the ultraviolet ray irradiation quantity Ii for the inside covering layer of the lens base may be selected from a range which insures hardening of the hard coating agent, and is, for instance, about 10 to 2,000 mj/cm$^2$, and preferably about 20 to 1,000 mj/cm$^2$ (e.g. about 50 to 1,000 mj/cm$^2$).

The ultraviolet irradiation can be effected with the use of a conventional ultraviolet irradiating apparatus such as a high pressure mercury lamp with a peak wavelength of about 365 nm.

[Masking step]

In the masking step, the hard coated layer on the outside surface of the lens base is masked with a releasable or peelable masking agent. The masking agent may only be capable of peeling or releasing with respect to the hard coated layer according to the species of the hard coated layer, and preferred masking agent is not peeled or eluted due to the antifogging agent. Such masking agent includes a resin composition comprising, for example, a poly(vinyl acetate), an ethylene-vinyl acetate copolymer, a poly(vinyl chloride), a vinyl chloride-vinyl acetate copolymer, a styrenic resin, an acrylic resin, a solvent-soluble polyester, a polyamide, a thermoplastic polyurethane and other thermoplastic resins, a thermosetting polyurethane, a silicone resin and other thermosetting resins. The masking agent may practically be employed as a coating composition containing an organic solvent such as hydrocarbons, esters, ketones or ethers (e.g. a solution of the resin in an organic solvent or a resin solution containing a coloring agent).

The preferable masking agent which is peelable with respect to the acrylic hard coated layer includes coating compositions each containing a chlorine-containing resin such as a vinyl chloride-based polymer comprising at least a vinyl chloride unit (e.g. a poly(vinyl chloride), a vinyl chloride-vinyl acetate copolymer, an ethylene-vinyl chloride copolymer, a propylene-vinyl chloride copolymer, a vinyl chloride-acrylonitrile copolymer, etc.), a vinylidene chloride-based polymer, a chlorinated polyolefin (e.g. a chlorinated polyethylene, a chlorinated polypropylene) or so forth. These chlorine-containing resins may be used independently or in combination. The preferred masking agent comprises a poly(vinyl chloride) or a vinyl chloride-vinyl acetate copolymer.

The masking with the use of the masking agent can be carried out by a process according to the shape or morphology of the lens base. By way of illustration, a non-round non-specific spherical or aspherical lens may be masked with the use of a coating apparatus automatically or semi-automatically, but the coating may practically be conducted by brushing (application with a brush).

Incidentally, since the whole of the plastic lens base has already been hard coated, the lens is not injured in the masking step and succeeding steps, hence the working operation is smoothed and the productivity of the lens is improved.

[Antifogging step]

In the antifogging step, at least the inside of the lens base may only be coated with the antifogging agent, and the both sides of the lens base may be coated with the antifogging agent. When the outside of the lens base is also treated with the antifogging agent, the antifogging agent on the outside of the lens base will be removed or eliminated together with the masking agent in the removing step.

As described above, the adhesive property between the hard coated layer and the antifogging agent can easily be enhanced by regulating or adjusting the degree of curing (hardening) of the hard coated layer, but, depending on the species of the hard coating agent or the curing of the hard coated layer, sufficient adhesion property with respect to the antifogging agent would not be expected occasionally. In such a case, the surface of the inside hard coated layer (cured layer) of the lens base may be treated before the coating with the antifogging agent, for the purpose of improving the adhesive property between the antifogging agent and the hard coated layer in the inside of the lens base. The surface treatment of the hard coated layer (cured layer) can effected, for example, according to any of the following alternations; (i) a process of subjecting the inside hard coated layer of the lens base to corona discharge treatment or plasma discharge treatment, (ii) a process of irradiating an ultraviolet ray with a short wavelength (e.g. with a wavelength of about 200 to 300 nm, in particular with a peak wavelength of about 254 nm) to the inside hard coating layer of the lens base with the use of a low pressure mercury lamp or the like for the activation, (iii) a process of subjecting the inside hard coated layer of the lens base to a treatment with an acid (e.g. hydrochloric acid, sulfuric acid, nitric acid, phosphoric acid and other inorganic acids, acetic acid, trichloroacetic acid, p-toluenesulfonic acid and other organic acids) or an alkali or base (e.g. sodium hydrochloride, potassium hydrochloride and other inorganic bases). In addition to the corona discharge treatment and plasma discharge treatment, the preferable process includes (ii) ultraviolet irradiation and (iii) alkali-treatment. The irradiation time (irradiation period) of the ultraviolet ray with a short wavelength in the ultraviolet ray irradiation may for instance be about 30 to 180 seconds and preferably about 50 to 100 seconds. The concentration of the inorganic base in the alkali-treatment is about 1 to 20% by weight and preferably about 1 to 10% by weight. The temperature and treating time in these treatments can be selected in consideration of the productivity and safety.

The antifogging agent may be chosen according to the species of the hard coating agent, and in order to retain high adhesive property for the hard coating agent even with a lapse of time, a resin having affinity for the hard coating agent, in particular a resin of the same species as the hard coating agent (e.g. a resin having a common chemical structure) can advantageously be employed. The antifogging agent having high affinity for the acrylic hard coated layer includes a (meth)acrylic thermosetting resin composition or a (meth)acrylic photo-curable resin composition (among them, an antifogging agent comprising an ultraviolet ray-curable resin composition). Therefore, in the antifogging step, it is preferable that at least the inside hard coated layer (hardened layer) is coated with an ultraviolet ray-curable antifogging agent, and the treated surface is irradiated with an ultraviolet ray to cure the antifogging coat.

The use of a composition as prepared by adding an ultraviolet ray-absorbent or an infrared-absorbent to the antifogging resin composition results in the formation of a functional layer having both of the antifogging property and the ultraviolet-absorptivity or infrared-absorptivity.

The treatment with the antifogging agent may be effected by a various technology such as immersing, spray coating, flow coating, spin coating or others. When a photo-curable resin composition is used as the antifogging agent, an irradiation apparatus as mentioned above can be utilized for the curing of the antifogging coat.

[Removing step]

In the removing step, the masking layer in the inside of the lens is removed or stripped from the hardened layer to give a plastic lens having a hard coated layer on the outside surface and an antifogging coated layer on the inside surface. When the outside hard coated layer, in addition to the inside layer, of the lens base is treated with the antifogging agent, the hard coated layer is exposed to the outside of the plastic base by removing the masking agent.

The removal of the masking layer may be conducted by a chemical technology such as elution with an organic solvent, a mechanical technology such as stripping or peeling off, or a combination of these technologies. The masking layer may practically be removed from the hard coated layer by means of stripping.

In the coating step with the use of a functional material except for the hard coating agent, when a functional layer except for antifogging layer (e.g. an ultraviolet ray-absorbable layer) is formed as the functional layer, an ultraviolet ray-absorbable layer or an infrared-absorbable layer can be formed by using a resin composition containing an ultraviolet ray-absorbent or an infrared-absorbent, and a photochromic layer may be formed with the use of a photochromic material, or a resin composition containing a photochromic material, as mentioned above. Further, the use of a fine powder (a fine powder of submicron order) of an inorganic compound such as silicon dioxide, silicon oxide, aluminum oxide, magnesium fluoride and gold provides an anti-reflecting layer.

The plastic lens comprising a hard coated layer on the outside surface is excellent in the scratch resistance (abrasion resistance), and since it has other functional layer inclusive of an antifogging coated layer in the inside surface, it is also excellent in the other function such as the antifogging property. Therefore, the plastic lens is useful as spectacles (glasses) or goggles worn outdoors, as in land sports, marine sports, driving of a bicycle, motorcycle or the like.

The plastic lens of the present invention may comprise, as necessary, an Infrared-absorbable layer such as near-infrared-absorbable layer, an infrared-reflecting layer, an ultraviolet ray-absorbable layer, a polarization layer, a photochromic layer, an antistatic layer, a protective layer for enhancing the chemical resistance or the like, in addition to the above-mentioned hard coated layer and coats (covering layers).

The plastic lens of the invention where a hard coated layer is formed in the outside and a layer having other function than the scratch resistance is formed on the inside surface has different functions (high scratch resistance and other function) on the each side. Further, the plastic lens comprising a coated layer with the scratch resistance on the outside surface, and an antifogging coated layer on the inside surface insures not only enhanced scratch resistance and durability but also excellent antifogging property so that it is not fogged or steamed up even under conditions with highly different humidities and temperatures.

According to the method of the present invention, a plastic lens having the different functions as mentioned above can efficiently be obtained with a few steps of hard coating, masking, coating with a functional material and removing of the masking.

The following examples are intended to describe the present invention in more detail but should by no means be construed to limit the scope of the invention.

EXAMPLES

Example 1

To the both sides of goggle lens (80 mm×150 mm, center thickness 2 mm, spherical) as molded by injection molding of a polycarbonate resin was applied, by immersing technology, a coating composition with a solid matter concentration of 40% by weight (organic solvent: mixed solvent of ethyl acetate/cellosolve/isopropyl alcohol) containing 100 parts by weight of a curable resin (Kyoeisha Kagaku Co., Ltd., PPZ-1000-N [a resin substituted with 6 acryloyl groups on the phosphazene ring, wherein $R^1$ is a polymerizable group in the formula (I), and $R^2$ and $R^3$ are respectively hydrogen atoms in the formula (II)] and 0.8 part by weight of benzyl peroxide as a thermo-polymerization initiator. The applied lens was subjected to thermosetting at 120° C. for 2.5 hours to form hard coated layers with a thickness of 7 μm.

The outside hard coated layer of the lens was masking-coated with a masking agent (Denki Kagaku Kogyo Co., Ltd., DENKALAC M21) by brushing, and thereafter an ultraviolet ray-curable acrylic antifogging agent (Kyoeisha Kagaku Co., Ltd., U-LIGHT 171) was applied onto the hard coated layers by immersing, the both sides of the lens were irradiated with an ultraviolet ray at a distance of 50 mm for 4 seconds with the use of a high pressure mercury lamp (manufactured by I-Graphics Co., Ltd., High Pressure Mercury Lamp H01-L212, 80 W/cm, 1 Kw, peak wave length 365 nm) to form an antifogging coated layer.

Thereafter, the masking on the outside surface of the lens was stripped to expose the hard coating layer to give a goggle lens wherein the inside surface was antifogging-coated.

The scratch resistance after the hard coating, wettability of the antifogging agent with respect to the hard coated layer, adhesive property and antifogging property of the antifogging coated layer were respectively evaluated in the following manner.

Scratch resistance: The hard coated layer was rubbed 10 times using a #0000 steel wool with a load of 200 g, and degree of scratch resistance was evaluated in accordance with the following criteria.

Evaluation criteria:

5: No scratch

4: A little scratches

3: Scratches

2: Severe scratches

1: Remarkable scratches

Wettability of the antifogging agent: The wettability of the antifogging agent with respect to the hard coated layer was evaluated according to the following criteria.

Evaluation criteria:

Excellent: Homogeneous coat

Good: Partial repellent of coat

Poor: Remarkable repellent of coat

Adhesive property of the antifogging coat: On the antifogging coated layer were formed 100 cross-cuts at intervals of 1 mm in the longitudinal and crosswise directions respectively using a sharp knife, Cellophane Tape® was applied onto the cross-cuts, the tape was removed off, and the number of the remained cross-cuts were counted.

Antifogging property of the antifogging coating: The degree of fogging (cloudiness) was evaluated according to the following criteria by a method of holding the film over a hot water (boiling water) at 80° C., or a method of holding the lens over a breath (sigh).

Evaluation criteria:

Excellent: No fogging

Good: Fogging disappeared when fogged

Poor: Fogging not disappeared and dewing

As a result, the lens showed a scratch resistance of "5", a wettability of the antifogging agent with respect to the hard coated layer of "5", an adhesive property of "100" and an antifogging property of "Excellent" each for the antifogging coat.

Example 2

A coating composition (organic solvent: ethyl acetate-cellosolve-isopropyl alcohol) containing a solid matter concentration of 40% by weight of an ultraviolet ray-curable resin [an ultraviolet ray-curable resin as prepared by adding a photopolymerization initiator to PPZ-1000-U:PPZ-1000-N manufactured by Kyoeisha Kagaku Co., Ltd. [a resin substituted with 6 acryloyl groups on the phosphazene ring wherein $R^1$ in the formula (I) is a polymerizable group, and $R^2$ and $R^3$ are respectively a hydrogen atom]] was applied, by immersing, to a goggle lens (80 mm×150 mm, center thickness of 2 mm, spherical) as produced by injection molding of a polycarbonate resin in a thickness of 7 μm. The coats of both sides of the lens were irradiated with an ultraviolet ray at a distance of 50 mm for 4 seconds with the use of a high pressure mercury lamp (manufactured by I-Graphics Co., Ltd., High Pressure Mercury Lamp H01-L212, 80 W/cm, peak wavelength 365 nm) to form hard coated layers.

To the hard coated layer on the outside surface of the lens was masking-coated with a masking agent (manufactured by Denki Kagaku Co., Ltd., DENKALAC M21) by brushing, and the resultant coated lens was immersed into an ultraviolet ray-curable acrylic antifogging agent (manufactured by Kyoeisha Kagaku Co., Ltd., U-LIGHT 171-U) to give coating, and the resultant coating was irradiated with the high pressure mercury lamp (irradiation distance 50 mm, irradiation time 4 seconds) to cure and form an antifogging coat. Thereafter, the masking of the outside surface of the lens was stripped to expose the hard coated layer, and hence a goggle lens as antifogging-coated on the inside surface was provided. vided.

As a result, the lens exhibited a scratch resistance of the hard coated layer of "5", an antifogging property of the inside surface when held up over a hot water at 80° C. of "Excellent", adhesive property between the hard coated layer and the antifogging coated layer of "100", respectively.

Example 3

Goggle lenses each having a hard coated layer on the outside surface and an antifogging coated layer on the inside surface were manufactured in the same manner as Example 2 except that the irradiation quantities of the ultraviolet ray were those shown in Table 1.

The relationship between the irradiation quantity, and the scratch resistance of the hard coated layer, the wettability of the antifogging agent with respect to the hard coated layer, the adhesive property and antifogging property of the antifogging coated layer were determined. The results are set forth in Table 1.

TABLE 1

| Irradiation time (sec.) | Scratch resistance of hard coat layer | Wettability of antifogging agent | Adhesive property of antifogging agent | Antifogging property (hot water) |
| --- | --- | --- | --- | --- |
| 1.3 | 4 | Excellent | 100 | Excellent |
| 1.7 | 4 | Excellent | 100 | Excellent |
| 2.6 | 5 | Excellent | 100 | Excellent |
| 3.5 | 5 | Excellent | 100 | Excellent |
| 5.5 | 5 | Excellent | 100 | Excellent |
| 7.0 | 5 | Excellent | 100 | Excellent |

Example 4

To the both sides of a goggle lens (80 mm×150 mm, center thickness 2 mm, spherical) was applied an ultraviolet ray-curable acrylic hard coating agent (manufactured by Fujikura Kasei Co., Ltd., FUJIHARD HO-U) in a thickness of 6 μm by immersing method, and using a high pressure mercury lamp, an ultraviolet ray was irradiated for 3.5 seconds for the outside surface and for 1.3 second for the inside surface for curing to form hard coated layers.

The outside hard coated layer of the lens was masking-coated with a masking agent (manufactured by Kansai Paint Co., Ltd., STRIP-PAINT) by brushing, and resultant lens was immersed and coated with the ultraviolet ray-curable acrylic antifogging agent (Kyoeisha Kagaku Co., Ltd., U-LIGHT 171-U), and was irradiated by means of a high pressure mercury lamp (irradiation distance 50 mm, irradiation time 4 seconds) to cure the agent, and thereby an antifogging coated layer was formed. The masking of the outside surface of the lens was peeled off to expose the hard coated layer and thereby to give a goggle lens, the inside surface of which was coated for antifogging.

The characteristics of the coats were evaluated, and as a result, the lens showed a scratch resistance of the hard coated layer of "5", an antifogging property of the inside surface held up over a hot water at 80° C. of "Excellent", an adhesive property between the hard coated layer and the antifogging coated layer of "100".

Example 5

The procedure of Example 4 was repeated except that the ultraviolet ray was irradiated to the coats of the hard coating agent of the both sides of the lens for 3.0 seconds or for 3.5 seconds, the outside surface was masked, the resultant lens was immersed into a 5 weight percent aqueous solution of sodium hydroxide at 35° C. for 40 seconds, and an antifogging agent was applied to the inside surface, to form the antifogging coat. The results are shown in Table 2.

TABLE 2

| Irradiation time (sec.) | Scratch resistance of hard coat layer | Wettability of antifogging agent | Adhesive property of antifogging agent | Antifogging property (hot water) |
| --- | --- | --- | --- | --- |
| 3.0 | 5 | Excellent | 100 | Excellent |
| 3.5 | 5 | Good | 90 | Excellent |

Example 6

A lens having a hard coated layer formed on the outside surface and an antifogging coated layer formed on the inside surface was obtained in the same manner as Example 3, except that to the both sides of a spherical lens of 80 mm in diameter as produced by injection molding of a polycarbonate resin was applied an ultraviolet ray-curable acrylic hard coating agent (Dainichi Seika Co., Ltd., DP-10) in a thickness of 5 μm, the coats of the both sides of the lens were irradiated with a high presssure mercury lamp (80 W/cm, distance 50 mm) for 2.6 seconds to form hard coated layers.

The characteristics of the coats were investigated, and as a result, the lens exhibited a scratch resistance of the hard coated layer of "4", an antifogging property of the inside surface held up over a hot water at 80° C. of "Excellent", and an adhesive property between the hard coated layer and the antifogging coated layer of "100".

Example 7

The procedure of Example 3 was repeated except that, in Example 6, the coatings of the hard coating composition on the both sides of the lens were irradiated with the ultraviolet ray for the time (second) shown in Table 3, and after masking treatment, the lens was immersed in a 5 weight percent aqueous solution of sodium hydroxide at 35° C. for 40 seconds, and the inside surface was applied with the antifoging agent to form an antifogging coat. The results are set forth in Table 3.

TABLE 3

| Irradiation time (sec.) | Scratch resistance of hard coat layer | Wettability of antifogging agent | Adhesive property of antifogging agent | Antifogging property (hot water) |
| --- | --- | --- | --- | --- |
| 2.6 | 4 | Excellent | 100 | Excellent |
| 3.0 | 4 | Excellent | 100 | Excellent |
| 3.5 | 5 | Excellent | 100 | Excellent |
| 7.0 | 5 | Excellent | 100 | Excellent |

Example 8

An ultraviolet-curable acrylic hard coating agent (manufactured by Dainichi Seika Co., Ltd., DP-20) was applied, in a thickness of 4 μm, to the both sides of a spherical lens with a diameter of 80 mm made of a polycarbonate resin, and an ultraviolet ray was irradiated to the outside surface for 7 seconds and to the inside surface for 3 seconds with the use of a high pressure mercury lamp (120 W/cm, distance 50 mm) to form hard coated layers.

The inside hard coated layer of the lens was irradiated at a distance of 70 mm for 90 seconds with the use of a low pressure mercury lamp (manufactured by Sen Tokushu Kogen Co., Ltd.), and the outside hard coated layer of the lens was masking-coated by brushing with the masking agent (manufactued by Kansai Paint Co., Ltd., STRIP-PAINT) used in Example 1. The resultant lens was immersed and coated with the ultraviolet-curable acrylic antifogging agent (Kyoeisha Kagaku Co., Ltd., U-LIGHT 171-U) used in Example 1, and coated lens was irradiated with the use of a high pressure mercury lamp (irradiation distance 50 mm, irradiation time 4 seconds) to cure the coatings and to form an antifogging coat. The masking of the outside of the lens was peeled to expose the hard coated layer, and thereby a lens inside surface of which was coated for antifogging was obtained.

As a result of investigation of the characteristics of the coats, the lens showed a scratch resistance of the hard coated layer of "5", an antifogging property of the inside surface held up over a hot water at 80° C. of "Excellent", and an adhesive property between the hard coated layer and the antifogging coated layer of "100".

Example 9

Antifogging coatings were formed in the same manner as Exmaple 8 except that coats of an acrylic hard coating composition (manufactured by Dainichi Seika Co., Ltd., DP-20) on the both sides of the lens were respectively irradiated with an ultraviolet ray using a high pressure mercury for the time shown in Table 4, respectively, to form hard coated layers. The characteristics of the coats were evaluated and the results are shown in Table 4.

TABLE 4

| Irradiation time (sec.) | Scratch resistance of hard coat layer | Wettability of antifogging agent | Adhesive property of antifogging agent | Antifogging property (hot water) |
|---|---|---|---|---|
| 2.6 | 4 | Excellent | 100 | Excellent |
| 3.0 | 4 | Excellent | 100 | Excellent |
| 3.5 | 5 | Excellent | 100 | Excellent |
| 7.0 | 5 | Excellent | 100 | Excellent |

Comparative Example 1

To a spherical lens with a diameter of 80 mm made of a polycarbonate resin was immersed and coated a hard coating composition containing a partial-hydrolyzed condensate of methyltriethoxysilane, and the coated lens were heated and cured to form hard coated layers in 5 μm thickness. The hard coated layers were subjected to pretreatment shown in the following table, and thereafter the pretreated lens was immersed and coated with the ultraviolet ray-curable acrylic antifogging agent (manufactured by Kyoeisha Kagaku Co., Ltd., U-LIGHT 171-U) and coats were irradiated with a high pressure mercury lamp (irradiation distance 50 mm, irradiation time 4 seconds) to cure the agent and thereby antifogging coats were formed.

The wettability of the antifogging agent and adhesive property of the antifogging coated layer each with respect to the hard coated layer were investigated to give results set forth in Table 5. In the above-mentioned adhesion test, the all antifogging coated layers were stripped so that Cellophane Tapes was applied to the coated layers and the tape was peeled off, and the degrees of peeling of the coated layers were evaluated according to the following criteria.

Evaluation criteria:
Excellent: No peeling of the coated layer
Good: Partial peeling of the coated layer
Poor: Nearly whole of the coated layer peeled

TABLE 5

| Pretreatment | Wettability of antifogging agent | Adhesive property No cross-out | Adhesive property With cross-out |
|---|---|---|---|
| No treatment | repelled | — | — |
| Aqueous solution of sodium hydroxide | | | |
| 10%, 40° C., 3 min. | coatable | Good | 0 |
| 15%, 55° C., 3 min. | coatable | Excellent | 0 |
| Low pressure mercuty lamp irradiation 50 mm | | | |
| 60 seconds | coatable | Excellent | 0 |
| 90 seconds | coatable | Excellent | 0 |
| Corona discharge | | | |
| 10 seconds | coatable | Excellent | 0 |
| 20 seconds | coatable | Excellent | 0 |

Comparative Example 2

To evaluate the stripping property (adhesive property) with respect to a plastic base, the following plastic lens bases were coated with the following polymer resin paints, and the stripping properties of the coated layers were determined. As a result, the coated layer was adhered to the lens base and could not be stripped in the all combinations.

Plastic lens base:

Poly(methyl methacrylate)

Polycarbonate

Poly(allyl diglycol carbonate)

Resin paint:

STRIP-PAINT manufactured by Kansai Paint Co., Ltd.

DENKALAC M21 manufactured by Denki Kagaku Co., Ltd.

What is claimed is:

1. A plastic lens which comprises;

a plastic lens base, a first acrylic hard coated layer formed on one side of said plastic lens base, and a second acrylic hard coated layer formed on the other side of said lens base and an antifogging coated layer, wherein the plastic lens is produced by the method comprising:

hard coating both sides of the plastic lens base with an ultraviolet ray-curable hard coating agent containing a polymerizable compound having an acryloyl group or a methacryloyl group to provide a hard coated lens having an inside and an outside surface;

irradiating said both surfaces of the hard coated lens with an ultraviolet ray;

masking the outside surface of the hard coated lens with a peelable masking agent;

coating at least the inside surface of the hard coated lens with the antifogging coated layer; and removing the masking layer, wherein during the irradiating step, a ratio of the ultraviolet ray irradiation quantity, Io, to the outside coated layer of the lens base relative to the ultraviolet ray irradiation quantity, Ii, to the inside coated layer of the lens base is such that Io/Ii equals 1/1 to 20/1 (times) to cure the coated layers.

2. The plastic lens as claimed in claim 1, wherein said lens base is formed from a polycarbonate or a poly-(diallyl glycol carbonate), said ultraviolet raycurable hard coating agent comprises a (meth)acrylate having a phosphazene ring, and said antifogging layer is formed from an ultraviolet ray-curable resin composition containing a (meth)acrylate having at least one hydrophilic group selected from the group consisting of a hydroxyl group, a carboxyl group and an ether group.

3. A plastic lens which comprises;

a plastic lens base, a first acrylic hard coated layer formed on one side of said plastic lens base, and a second acrylic hard coated layer formed on the other side of said lens base and an antifogging coated layer, wherein the plastic lens is produced by the method comprising:

hard coating both sides of the plastic lens base with an ultraviolet ray-curable hard coating agent containing a polymerizable compound having an acryloyl group or a methacryloyl group to provide a hard coated lens having an inside and an outside surface;

irradiating said both surfaces of the hard coated lens with an ultraviolet ray;

masking the outside surface of the hard coated lens with a peelable masking agent;

coating at least the inside surface of the hard coated lens with the antifogging coated layer; and removing the masking layer, wherein during the irradiating step, the inside covering layer is irradiated with an irradiation quantity which produces a hardness which is 50 to 98% of saturated hardness.

* * * * *